Jan. 22, 1957  M. L. LUCAS  2,778,052
COMBINATION EXPANSION HINGE FOR TRANSPORTATION VEHICLE DOOR
Filed Aug. 24, 1955
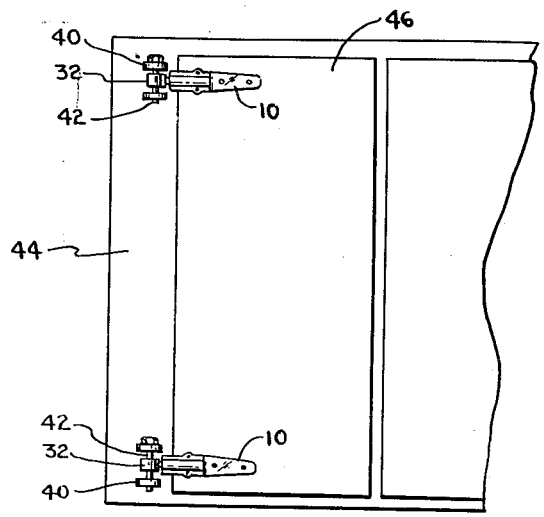
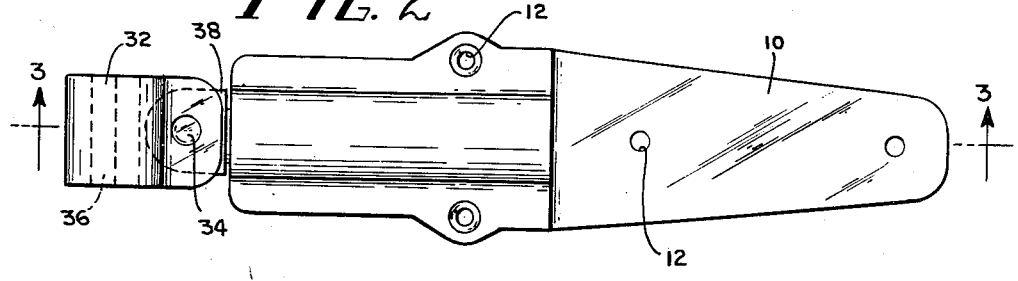
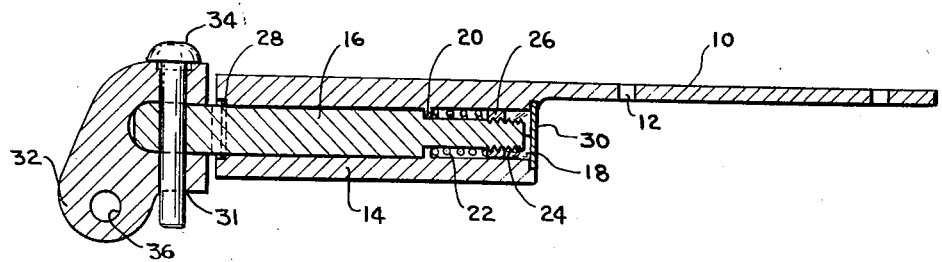
INVENTOR.
MATT L. LUCAS
BY H. F. Woodward
ATTORNEY

United States Patent Office 2,778,052
Patented Jan. 22, 1957

2,778,052

COMBINATION EXPANSION HINGE FOR TRANSPORTATION VEHICLE DOOR

Matt L. Lucas, Minneapolis, Minn.

Application August 24, 1955, Serial No. 530,389

7 Claims. (Cl. 16—130)

This invention relates to improvement in hinges and more particularly for hinges for semitrailer truck doors.

An object of the invention is the provision of an expansion hinge that eliminates or substantially eliminates breakage of the hinges in use in connection with trailer doors.

Another object of the invention is to provide a hinge that eliminates the tearing of the hinge mounting in use on semitrailer truck doors and the arrangement that will permit the abutting of the doors one against the other as the mounting bolts become worn or expanded.

Other and further objects of the invention and the advantages of the same will be pointed out hereinafter and indicated in the appended claims, or will be obvious to one skilled in the art upon understanding of the present disclosure.

In the drawings:

Figure 1 is a view of a trailer or semitrailer truck door (with parts broken away) showing the new improved hinge attached thereto and to a trailer or semitrailer;

Figure 2 is a top plan view of the improved hinge; and,

Figure 3 is a sectional view taken along lines 3—3 of Figure 2.

When the automobile trailer or semitrailer follows the curvature of the road and when the trailer unit is parked on an incline or uneven loading platform, there is generally distortion of the trailer doors. When in use the trailer body usually twists as the trailer follows the curvature of the road. These actions result in tearing the hinge from its mounting or the breakage of the hinge or its mounting.

Referring to the drawings in detail, 10 is the body of the hinge which is provided with openings 12 to receive the means for securing the hinge to the trailer door. Two of the openings 12 are spaced on opposite sides of the hinge housing 14. This with the arrangement of one or more openings directly in line with the housing in important in properly securing the long lasting proper use to the hinge. The housing or tube 14 is provided with an axial bore 18 in which is mounted sliding pin 16. The bore 18 adjacent the end is preferably of the shape of the nut 26. This is to insure that the nut will not work loose from the bore during use. It is generally preferred that the shape of the chamber 18 and the nut 26 be hexagonal, although it is to be understood that it might take various other shapes. The sliding pin 16 is provided with a reduced size at one end around which is mounted an expanding spring 22. The reduced end is threaded at 24 to receive nut or stop member 26. This spring rests against projection or shoulder 20 which extends into a chamber 18 and against the stop member 26. An end of the chamber 18 is closed by suitable means such as cap 30. The tension on the spring 22 is changed by adjusting the nut 26. The spring 22 is retractable against the stop member 26 and urges the door in the direction of the hinge pivot.

To insure that dust and dirt do not enter the bore 18 of the housing 14 and interfere with the operation of the sliding pin 16, a gasket 28 is provided adjacent one end of the cylinder opening 18. The gasket may be any suitable means type as, for example, a ring. The cap 30 and the gasket 28 act to retain the lubricant normally carried in bore 18.

The sliding pin 16 extends beyond the end of the housing 14 at one end and this end is provided with opening 31 into which substantially horizontally joining pin 34 extends in securing oscillatable offset hinge member 32 to the sliding pin 16. The joining pin may have the head flush with the body of the oscillatable hinge member. In such event, the opening 31 is countersunk. The oscillatable hinge member 32 is provided with a pin opening 36 through which substantially vertically pin 42 extends, securing the oscillatable hinge member 32 to members 40 which are suitably secured to the truck body 42. They may be secured to the truck body 42 by any suitable means, such as by welding or the like.

The truck, trailer or the like door can be adjusted as need be by the nut 26 which holds expansion spring 22 in place. By tightening or loosening the nut 26 the door travel is adjusted and when the desired travel is set, the adjustment will not vary since the nut 26 in the housing 14 being of the same shape will keep the nut from turning and the adjustment will be constant. The upward and downward travel of the door 46 is as essentail as the cross travel. This is true because when the door opening becomes out of square, the door will have to fit into the distorted opening. The distortion of trailer doors is, in general, caused by the twist in the trailer body when in transport.

No special tools are required to assemble the hinge which results in very simple assembly. The expansion spring and hexagonal nut are placed in position in the enlarged end of the bore 18, then the oscillating cam and sliding pin are assembled together. The cam and sliding pin then fit into the bore 18 and the threaded end of the pin 24 of the sliding pin passes through the expansion spring and into the hexagonal nut which is held in place and kept from turning by the hexagonal diameter of the bore 18 at the enlarged portion thereof. The sliding pin is threaded into the nut 26 to any extent to create a slight pressure on the spring 26. The hinge is now ready to be secured to the truck door and to the truck. The improved hinge involves a horizontal hinge pin or plunger which takes the strain off the hinge when the trailer body weaves or rocks. This desirable result is in part due to the sliding or telescopically-mounted plunger with the separate vertical and horizontal hinge pins.

What is claimed:

1. A hinge comprising a housing adapted to be fixed to a door, said housing having an axial bore with a restriction in the said bore spaced from the ends thereof, a bolt slideable and turnable in said bore, said bolt having a reduced diameter portion at one end, at least a part of said reduced portion machined to receive a mating member, a mating member on the machined portion, an expanding spring circumposed on said reduced diameter portion of said bolt between the said mating member and the restriction in the said bore, and an offset hinge member secured to the other end of the said bolt.

2. A hinge comprising a housing having a substantially flat portion extending from one end of the housing, the said housing having an axial bore, a shoulder member in the bore and spaced from the end of the bore, a bolt slideable and oscillatable in said bore, said bolt reaching axially outwardly beyond the bore at the other end of the housing, a member secured to the outwardly reaching portion of said bolt, one end of said bolt having a reduced diameter and threaded to receive an adjustable stop member, an adjustable stop member, an expanding spring circumposed on said reduced diameter portion and between said adjustable member and the said stop member.

3. A hinge assembly comprising a housing to be affixed to a door, an axial bore in said housing, said bore for a major portion of its length being substantially circular and a minor portion being of a different configuration, the said bore being of reduced diameter at the junction between the circular and the other portion of the bore, a bolt slideable and turnable in said bore, said bolt being of reduced diameter on one end, a portion of the reduced diameter threaded to receive a nut, a threaded nut, a spring circumposed on said reduced portion of the bolt and between the reduced diameter portion of the bore and the nut threaded on the threaded bolt portion, means removably attached to said bolt for securing the same to the door.

4. A device of the class described in claim 3 in which the means for securing the hinge assembly to a door is spaced substantially in alignment with the said bore and on both sides of said housing.

5. A hinge comprising a housing adapted to be secured to a door, said housing provided with an axial bore, a slideable hinge member mounted in said axial bore, spring means in the bore engaging the housing and the slideable member and urging the slideable member into the bore, a hinge element secured to said slideable hinge member with a substantially horizontally extending hinge pin, extending through the hinge element and the sliding hinge member and the last mentioned hinge element secured to a supporting member by a substantially vertically extending hinge pin.

6. A hinge comprising a telescopically mounted parts adapted to be secured to a door, a hinge element secured to one of said parts of the telescopically hinged parts by means of substantially horizontally extending pin and said hinge element secured to a supporting surface by means of a substantially vertically extending hinge pin and spring means extending between the telescopically mounted parts urging said parts together.

7. A hinge assembly comprising a housing having an axial bore therein and adapted to be secured to a door, a plunger mounted in said axial bore, an adjustable stop member on the plunger, a spring circumposed about the plunger and retractable against the stop member and a hinge part secured to the plunger by substantially horizontally extending hinge pin, said hinge part connected to a supporting surface by means including a substantially vertically extending hinge pin.

References Cited in the file of this patent

UNITED STATES PATENTS 1,490,956      Binder _____ Apr. 22, 1924